(12) United States Patent
Black et al.

(10) Patent No.: US 11,461,630 B1
(45) Date of Patent: Oct. 4, 2022

(54) MACHINE LEARNING SYSTEMS AND METHODS FOR EXTRACTING USER BODY SHAPE FROM BEHAVIORAL DATA

(71) Applicant: Max-Planck-Gesellschaft zur Förderung der Wissenschaften e.V., Munich (DE)

(72) Inventors: Michael Julian Black, Tuebingen (DE); Eric Rachlin, Brooklyn, NY (US); Matthew Loper, San Francisco, CA (US); Jonathan Robert Cilley, New York, NY (US); William John O'Farrell, Newport, RI (US); Alexander Weiss, Boston, MA (US); Jason Lawrence Gelman, New York, NY (US); Steven Douglas Hatch, Maplewood, NJ (US); Nicolas Heron, New York, NY (US); Javier Romero Gonzalez-Nicolas, Barcelona (ES)

(73) Assignee: Max-Planck-Gesellschaft zur Förderung der Wisenschaften e.V., Munich (DE)

( * ) Notice: Subject to any disclaimer, the term of this patent is extended or adjusted under 35 U.S.C. 154(b) by 1029 days.

(21) Appl. No.: 15/913,589

(22) Filed: Mar. 6, 2018

Related U.S. Application Data (60) Provisional application No. 62/467,452, filed on Mar. 6, 2017.

(51) Int. Cl.
*G06N 3/08* (2006.01)
*G06Q 50/00* (2012.01)
(Continued)

(52) U.S. Cl.
CPC ........... *G06N 3/08* (2013.01); *G06Q 30/0621* (2013.01); *G06Q 30/0643* (2013.01);
(Continued)

(58) Field of Classification Search
CPC .. G06N 3/08; G06Q 30/0643; G06Q 30/0621; G06Q 50/01; G06T 19/00; G06T 2200/00; G06T 2210/16
See application file for complete search history.

(56) References Cited

U.S. PATENT DOCUMENTS 6,546,309 B1 * 4/2003 Gazzuolo ........... G06Q 30/0601
                                                        33/512
8,478,663 B2 * 7/2013 Lu .......................... G06Q 30/00
                                                        705/26.7
(Continued)

FOREIGN PATENT DOCUMENTS

| WO | WO 2014/053198 | 4/2014 |
| WO | WO 2016/207311 | 12/2016 |
| WO | WO 2017/129827 | 8/2017 |

OTHER PUBLICATIONS

Xi et al. Human Body Shape Prediction and Analysis Using Predictive Clustering Tree. 2011 International Conference on 3D Imaging, Modeling, Processing, Visualization and Transmission. DOI 10.1109/3DIMPVT.2011.32. pp. 196-203. (Year: 2011).*
(Continued)

*Primary Examiner* — Amy M Levy
(74) *Attorney, Agent, or Firm* — Knobbe, Martens, Olson & Bear, LLP (57) ABSTRACT

Disclosed are systems and techniques for extracting user body shape (e.g., a representation of the three-dimensional body surface) from user behavioral data. The behavioral data may not be explicitly body-shape-related, and can include shopping history, social media likes, or other recorded behaviors of the user within (or outside of) a networked content delivery environment. The determined body shape can be used, for example, to generate a virtual fitting room user interface.

18 Claims, 6 Drawing Sheets

(51) Int. Cl.
*G06Q 30/06* (2012.01)
*G06T 19/00* (2011.01)

(52) U.S. Cl.
CPC ............ *G06Q 50/01* (2013.01); *G06T 19/00* (2013.01); *G06T 2200/08* (2013.01); *G06T 2210/16* (2013.01)

(56) References Cited

U.S. PATENT DOCUMENTS

| | | | | |
|---|---|---|---|---|
| 8,525,828 | B1* | 9/2013 | Bates | G06T 15/00 345/419 |
| 8,898,581 | B2* | 11/2014 | Homma | G06F 16/9535 715/763 |
| 9,378,593 | B2* | 6/2016 | Chhugani | G06T 19/00 |
| 9,773,274 | B2* | 9/2017 | Curry | G06T 13/40 |
| 10,636,206 | B2* | 4/2020 | Chen | G06T 15/04 |
| 10,963,812 | B1* | 3/2021 | Varadarajan | G06N 5/04 |
| 10,984,342 | B2* | 4/2021 | Yu | A41H 43/00 |
| 2010/0111370 | A1 | 5/2010 | Black | |
| 2011/0099122 | A1* | 4/2011 | Bright | G06Q 10/04 705/348 |
| 2012/0299912 | A1* | 11/2012 | Kapur | G06F 3/017 345/419 |
| 2014/0176565 | A1* | 6/2014 | Adeyoola | G06F 16/5854 345/473 |
| 2015/0206341 | A1* | 7/2015 | Loper | G06T 17/10 345/420 |
| 2016/0055499 | A1* | 2/2016 | Hawkins | G06Q 50/01 705/7.33 |
| 2016/0162779 | A1* | 6/2016 | Marcus | G06N 20/10 706/12 |
| 2016/0180447 | A1* | 6/2016 | Kamalie | G06Q 30/0643 705/27.2 |
| 2016/0300252 | A1* | 10/2016 | Frank | G06F 16/24578 |
| 2017/0004567 | A1* | 1/2017 | Dutt | G06Q 30/0643 |
| 2017/0091844 | A1* | 3/2017 | Yarvis | G06Q 30/0631 |
| 2017/0185894 | A1* | 6/2017 | Volkovs | G06N 3/0454 |

OTHER PUBLICATIONS

Bogo, F., Black, M. J., Loper, M., Romero, J. Detailed Full-Body Reconstructions of Moving People from Monocular RGB-D Sequences. In International Conference on Computer Vision (ICCV), pp. 2300-2308, Dec. 2015.

Bogo, F., Kanazawa, A., Lassner, C., Gehler, P., Romero, J., Black, M. J. Keep it SMPL: Automatic Estimation of 3D Human Pose and Shape from a Single Image, in Computer Vision—ECCV 2016, Lecture Notes in Computer Science, Springer International Publishing, 2016.

Hill, M., Streuber, S., Hahn, C., Black, M. J., O'Toole, A. Creating body shapes from verbal descriptions by linking similarity spaces. Psychological Science, Nov. 2016 vol. 27 No. 11 pp. 1486-1497.

Kosinskia, M., Stillwell, D., and Graepel, T., Private traits and attributes are predictable from digital records of human behavior. PNAS, 110(15):5802-5805, 2013.

Loper, M., Mahmood, N., Romero, J., Pons-Moll, G., Black, M. J. SMPL: A Skinned Multi-Person Linear Model. ACM Trans. Graphics (Proc. SIGGRAPH Asia), 34(6):248:1-248:16, ACM, New York, NY, Oct. 2015.

Streuber, S., Quiros-Ramirez, M., Hill, M., Hahn, C., Zuffi, S., O'Toole, A., Black, M. J. Body Talk: Crowdshaping Realistic 3D Avatars with Words. ACM Trans. Graph. (Proc. SIGGRAPH), 35(4):54:1-54:14, Jul. 2016.

Weiss, A., Hirshberg, D., Black, M. J. Home 3D body scans from noisy image and range data. In Int. Conf. on Computer Vision (ICCV), pp. 1951-1958, IEEE, Barcelona, Nov. 2011.

* cited by examiner

MACHINE LEARNING SYSTEMS AND METHODS FOR EXTRACTING USER BODY SHAPE FROM BEHAVIORAL DATA

CROSS-REFERENCE TO RELATED APPLICATIONS

The present application claims the benefit under 35 U.S.C. § 119(e) of U.S. Provisional Patent Application No. 62/467,452, filed on Mar. 6, 2017, entitled "TECHNOLOGIES TO RELATE BODY SHAPE AND METADATA," the contents of which is hereby incorporated by reference herein in its entirety and for all purposes.

BACKGROUND

Three-dimensional (3D) models of the human body have become sophisticated and highly detailed, with the ability to accurately model human shapes and poses. Body shape is often captured using expensive scanning systems (e.g., laser, stereo, structured light) or commodity depth sensors, or extrapolated from sets of stereoscopic images.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

The present disclosure is generally directed to using machine learning systems to analyze behavioral data for identifying the body shape of human users corresponding to the behavioral data. Behavioral data refers to the "footprint" of a user of an electronic system, for example, an electronic commerce system or social networking system. Certain types of behavioral data such as clothing purchases and shape-related comments can represent strong signals regarding the body shape of the user ("shape-related behavioral data"); however, non-shape related behavioral data can represent weak signals regarding the body shape of the user. While a behavioral timeline (e.g., a timeline of actions performed in a networked environment) of a given user may have sparse shape-related behavioral data, it may also include large volumes of non-shape related behavioral data (e.g., purchases of household items, positive reviews of certain movies, reading certain news articles). The disclosed machine learning techniques can extract both the strong and weak signals regarding the body shape of the user from such behavioral data.

The estimation of three-dimensional ("3D") human body shape is important for many applications in the clothing industry, fitness, health, special effects, virtual reality, and video games to name a few. Body shape is often captured using expensive scanning systems (e.g., laser, stereo, structured light) or commodity depth sensors, or from sets of stereoscopic images; however, one drawback of such systems is their requirement for specialized optical devices to capture the data that is used for estimation of body shape. Typically, body shape data can be generated by users taking their measurements, being scanned using a 3D scanning device, or submitting photos depicting themselves. However, these approaches have a number of drawbacks, including time required of users, expense (particularly for 3D scanning), and that some users may not want to submit their images.

The aforementioned problems, among others, are addressed in some embodiments by the disclosed machine learning systems that can estimate body shape from behavioral data representing actions of a given user within a digital environment. If a user opts in to this feature, for example, the system can make a prediction of their body shape without requiring any hassle or expense to the user. Machine learning is a field of computer science that gives computers the ability to learn to make predictions without being explicitly programmed, for example, enabling computing systems to learn complex patterns or hidden relationships within data. The disclosed machine learning systems can learn to estimate user body shape from their behavioral history through being exposed to large volumes of labeled training data.

By body shape, the present disclosure means one or all of subjective, qualitative or metrically accurate information about the body that can be used to size clothing, create avatars, provide style advice, measure health risks, etc. This may be in the form of a 3D "model" of the body, which can be represented by a mesh, point cloud, voxel grid, or other graphics representation. This model may be parametric such that the body shape is captured by a number of parameters. Shape may also be represented by qualitative descriptions whether abstract or related to linguistic descriptions like "curvy" or "slim." Additionally body shape may be embodied in a statistical or neural network representation. These are all representations of shape in the sense that one can convert back and forth between them and they all support the extraction of measurements and the visualization of the body. All of the above are referred to as "shape." As used herein, an accurate shape is not a concept, activity, or behavior but rather a metric corresponding to specific measurements in the real world.

A machine learning model as described herein can detect one or more of these shapes depending upon the shapes labeled in its training data. The approaches described herein can estimate shape from metadata that may not contain an explicit or direct connection with shape. As a canonical example, the techniques can use behavioral data that can be obtained about a subject from a social networking site and/or from shopping and reviewing behavior on shopping websites and applications. The disclosed technology applies more generally to any behavioral data about a user that is acquired via the Internet or other means. The determined shape can be used to identify other shape-related measurements, such as standard tailoring measurements on the body, body type, or information related to clothing size.

Such behavioral data, though not explicitly related to body shape, includes signals about the body shape of the user. For example, if a user's behavioral data indicates that he or she takes part in activities related to sports, this may indicate that he or she is fit and has a corresponding fit body shape. If the user visits dieting websites it may indicate that he or she is not a particular weight or body/mass index. The friends of a user may have similar body shapes if they engage in similar activities. The body shapes of the user's family members may be used to suggest similarities in the user's body shape (or certain parameters of the body shape) due to genetics. Demographics include, but are not limited to, where a user lives, one's age, whether one is married or single, one's profession, and one's education, and these may all provide predictive signals about body shape. If the user owns a dog, the user may go on more walks. Health records (including whether a user has borne children; has any injuries that limit activity; has diabetes, joint problems, or heart disease; has had body altering or cosmetic surgeries, or gastric bypass surgery; etc.) may inform body shape.

While such behavioral data is possibly sparse, noisy, and often provides only weak cues about body shape, by aggregating sufficient amounts of such data, the disclosed techniques can constrain the possible shape of the individual. Combining this behavioral data with image data or other concrete shape data can further improve the estimate of body shape. Using this approach, a user can log into a social media or electronic commerce service and the disclosed technology can automatically extract body shape information. This can optionally be presented to the individual for confirmation or correction.

Machine learning can be implemented to extract the meaningful body shape signal from the behavioral data. In some cases, a parametric 3D body shape model can be implemented for the shape prediction. This is useful because body shape can be described by a small number of parameters (e.g., 10) and this model can then serve to translate body shape into other representations (meshes, avatars, measurements, clothing sizes). That is, the parametric model serves as a "universal" body shape representation, allowing different shape representations to be translated into each other.

Although aspects of some embodiments described in the disclosure will focus, for the purpose of illustration, on particular examples of machine learning models, body shape representations, and behavioral data, the examples are illustrative only and are not intended to be limiting. Various aspects of the disclosure will now be described with regard to certain examples and embodiments, which are intended to illustrate but not limit the disclosure.

Overview of Example Body Shape Prediction

Figure 1A:
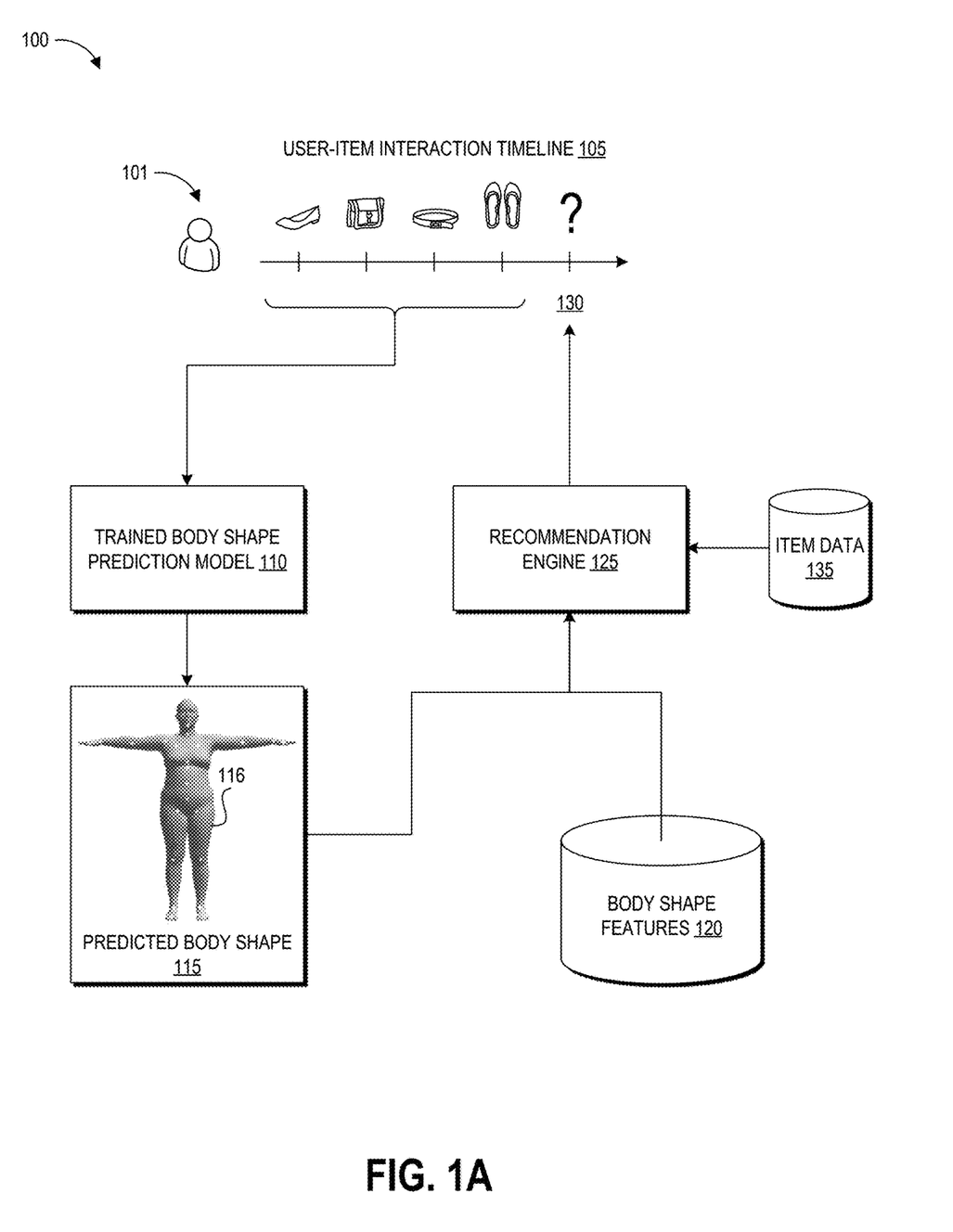
FIG. 1A depicts a graphical example of a body shape prediction and corresponding recommendation according to the present disclosure.

FIG. 1A depicts a graphical example 100 of a predicted body shape 115 and a recommendation 130 that can be generated based on the predicted body shape 115 according to the present disclosure. As described above, the approaches described herein can extract body shape information from sources other than body scanning systems, including data that may not pertain to body shape. In the example of FIG. 1A, a user-item interaction timeline 105 includes information regarding interactions between the user 101 and items represented within an electronic marketplace. The items can be digital or physical goods, and the interactions can include one or more of purchases, returns, reviews, detail page views, and the like. Some implementations may limit the analyzed behavioral data to item purchases (and optionally returns), as this may provide the strongest signal of the user's body shape. As used herein, the term "item," in addition to having its ordinary meaning, is used interchangeably to refer to an item itself (e.g., a particular product) and to its description or representation in a computer system, such as an electronic catalog. As will be apparent from the context in which it is used, the term is also sometimes used herein to refer only to the item itself or only to its representation in the computer system.

In the example of FIG. 1A, the timeline 105 includes data representing shoes, a purse, and a belt purchased (or otherwise interacted with) by the user. This is provided, for example, in the form of a vector or other low dimensional representation of the interactions, to the trained body shape prediction model 110. The trained body shape prediction model 110 analyzes the timeline 105 and outputs a predicted body shape 115 of the user 101. The predicted body shape 115 can be in the form of a mesh-based body model 116, which can be a Skinned Multi-Person Line ("SMPL") body model, as described in more detail with respect to FIG. 4B.

The recommendation engine 125 can use this predicted body shape 115 together with body shape features 120 related to the predicted body shape 114 to make recommendations. The extracted body shape features can include, for example, particular clothing sizes, tailoring measurements, body shape category, a facet of body shape (e.g., a shape or shape category of a particular portion of the body, such as head size), or other metrics that correspond to the predicted body shape 115. In some examples, rather than predicting the full 3D model of the predicted body shape 115, the body shape prediction model 110 can be trained to predict an extracted body shape feature. The recommendation engine 125 can then correlate these size metrics with specific items available in the item data repository 135, for example, clothing items available for purchase through an electronic catalog. The recommendation engine 125 can also use the body model and/or the shape features to determine a predicted fit between the user and a given item. The recommendation engine 125 can then output a recommendation 130 for one or more of these items to the user 101, for example, in a user interface that displays a model of the clothing item on the predicted body shape model to provide the user with a visual indication of the potential fit of that item.

The example of FIG. 1A includes the timeline 105 representing interactions between the user and the items within the electronic marketplace. Although discussed in the context of a timeline of multiple events, some examples can use a timeline with a single event (e.g., a purchase of a particular size of apparel). Other examples can additionally or alternatively use other types of user behavioral data. Such behavioral data can include friends and/or likes within a social network, likes and/or ratings of media content (e.g., movies, songs), photographs and videos captured by the user (whether they depict the user or not), and user comments, hashtags, and browsing behavior with respect to network-accessible content. Further, in some implementations logged user behaviors may not include timestamps or other temporal indications, and thus, instead of timelines a more general representation, of user behavior can be used. As used herein, behavioral data includes all of these types of information. This behavioral data can optionally be combined with other measures such as images, range data/scans, measurements, or linguistic ratings (e.g., shape-specific descriptive words regarding a user's body shape) to obtain body shape information.

Figure 1B:
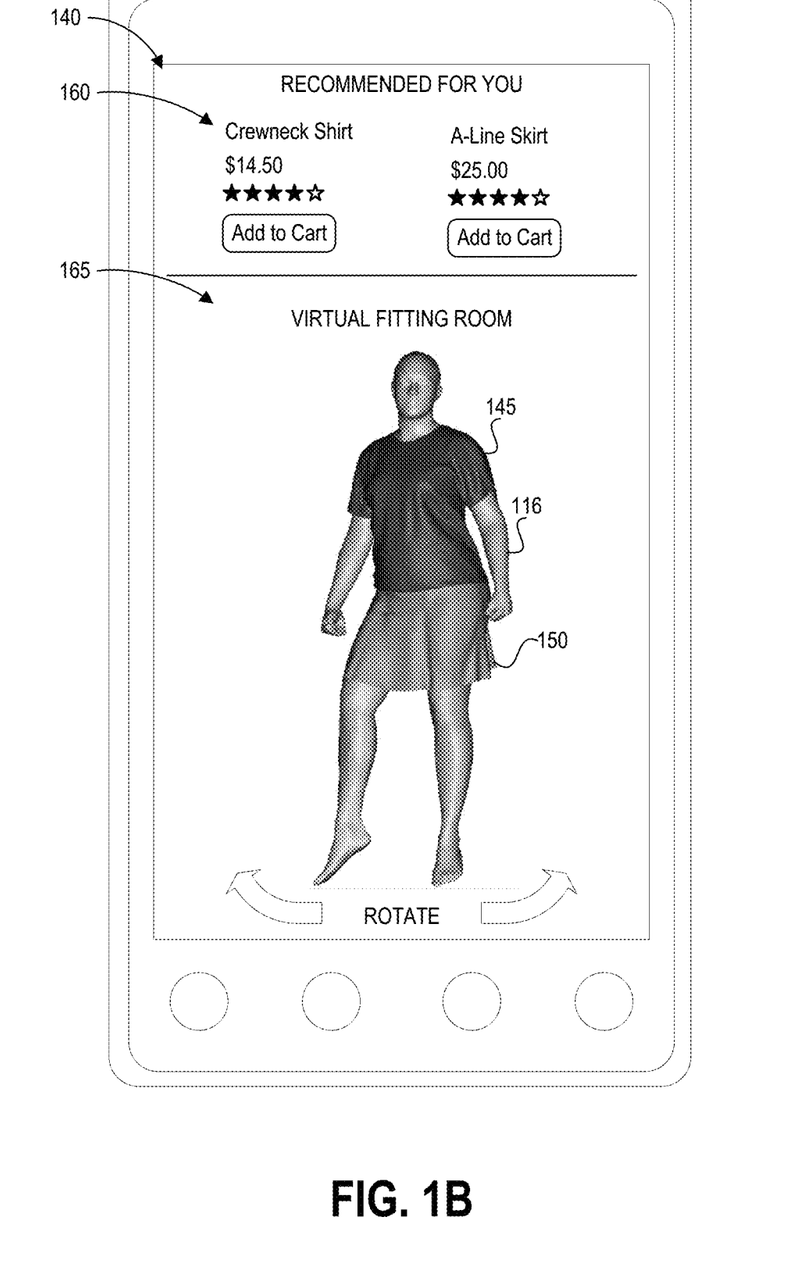
FIG. 1B depicts an example user interface for displaying a body-shape-based recommendation according to the present disclosure.

FIG. 1B depicts an example user interface 140 for displaying a body-shape-based recommendation according to the present disclosure. The user interface 140 includes information 160 regarding two clothing items 145, 150 that have been recommended for, or otherwise selected by or for, the user. These items may be identified using the example system of Figure 1A in some embodiments, such that the selected items are based at least partly on the predicted body shape of the user. In other implementations, the selected items may be identified based on other data, for example, past item views or purchases of the user. In still other implementations, these items may be selected by the user for viewing in the user interface 140, for example, by the user locating the items in the electronic catalog (e.g., via browsing or searching) and selecting a user interface element to view the items in a virtual fitting room 165.

The user interface 140 also includes a portion or area that may be referred to as a virtual fitting room 165 and in which the body model 116 is displayed with the clothing items 145, 150 overlaid onto the contours of the body model 116. For example, a rendering system can take the body model 116 and a 3D model of the clothing items 145, 150 as input for generating the virtual fit display. The rendering system can align the 3D models of the clothing items 145, 150 with the appropriate locations on the body model 116, and then can determine how to deform the 3D models of the clothing items 145, 150 based on the contours of the body model 116 and the size of the 3D models of the clothing items 145, 150. In other examples, the recommendation can include an indication of how the item will fit the user without necessarily displaying the body model itself, for example by displaying a clothing item as if it were deformed by the contours of the body model, by displaying a textual indication regarding predicted fit, or by displaying just a portion of the body model. Beneficially, this can provide the user with a visual indication of how these particular garments may fit the actual body of the user, which is a common question of users who shop for clothing electronically, as they cannot physically try on the garments prior to purchase. The disclosed user interface addresses this problem by using the predicted body shape of the user to display a virtual fit.

The illustrated user interface 140 is also an example of a specific manner of displaying information to the user, rather than using conventional user interface methods which typically display a photo of clothing as physically worn by another person or mannequin, on a dress form, or unworn. Such conventional user interfaces do not provide users with a visual representation of how the clothing item will fit their particular body shape. Thus, the present disclosure describes a specific improvement over prior systems, resulting in an improved user interface for electronic devices.

Overview of Example Image Augmentation System

Figure 2:
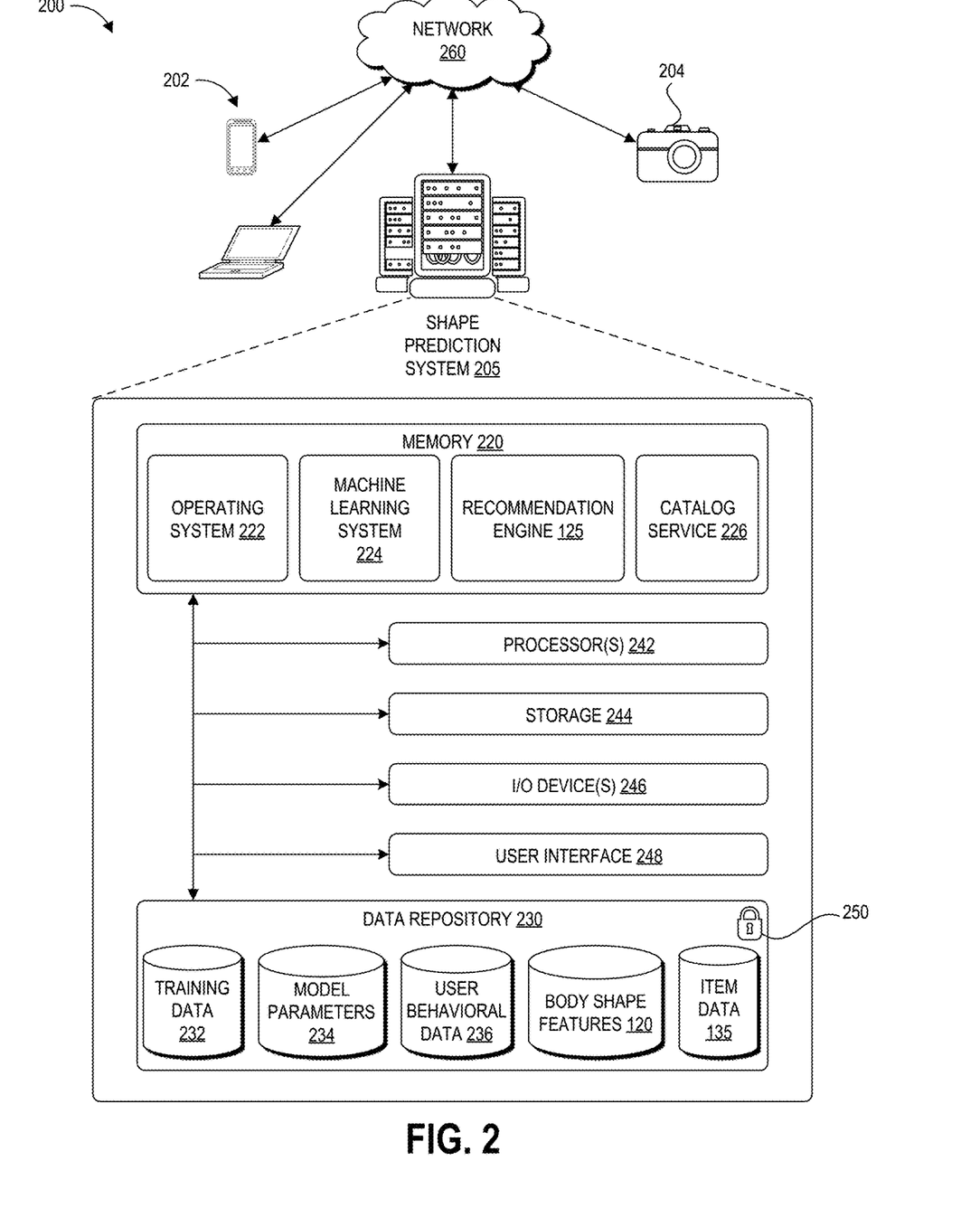
FIG. 2 is a block diagram of an illustrative shape prediction system configured to implement machine learning for predicting body shape from behavioral data, for example, as depicted in FIG. 1A.

FIG. 2 is a block diagram of an illustrative computing environment 200 of a shape prediction system 205 configured to implement machine learning for predicting body shape from behavioral data, for example, as depicted in FIG. 1A. As illustrated, the computing environment 200 includes the shape prediction system 205, an image acquisition device 204, and user computing devices 202 configured to communicate data with one another via a network 260. Though shown separately, in some embodiments, the image acquisition device 204 may be integrated into a user computing device 202, for example, as a smartphone or tablet with an integrated camera.

The shape prediction system 205 includes at least one memory 220 and one or more processing units (or processor(s)) 242. The memory 220 may include more than one memory and may be distributed throughout the shape prediction system 205. The memory 220 may store specific program instructions that are loadable and executable on the processor(s) 242 as well as data generated during the execution of these programs. Depending on the configuration and type of memory, the memory 220 may be volatile (such as random access memory ("RAM")) and/or non-volatile (such as read-only memory ("ROM"), flash memory, or other memory). In some examples, the memory 220 may include multiple different types of memory, such as static random access memory ("SRAM"), dynamic random access memory ("DRAM"), or ROM.

The memory 220 can store the specific program instructions as a number of modules that configure processor(s) 242 to perform the various functions described herein, for example, operating system 222 for interacting with the computing environment 200, as well as machine learning system 224, catalog service 226, and recommendation engine 125. The machine learning system 224, recommendation engine 125, and catalog service 226 can be in direct communication with one another or distributed among computing devices within a networked computing system and in communication with each other. Components used for the architecture may depend at least in part upon the type of network and/or environment selected.

Users can browse an electronic catalog provided by the catalog service 226 or query a search engine to obtain information about electronic catalog content stored in item data repository 135. In one embodiment, these items can include physical and/or digital products, such as media (books, audio, video, etc.), clothes, electronics, and appliances, to name a few. The electronic catalog content can include detailed information about these products as well as services. The catalog service 226 can provide functionality for users to browse the items or search the catalog. Users can select an item to see more details about an item. In response to a user item selection, the interactive computing system 200 can provide to a user system a catalog page (sometimes called an item detail page) that includes details about the selected item. Users may acquire (e.g., purchase, rent, or stream) items from the catalog service 226.

The machine learning system 224 can include one or more machine learning models for performing the described body shape prediction tasks. Such a machine learning model may be referred to herein as a "shape prediction model." The shape detection model of the machine learning system 224 can be trained to identify, from the input behavioral data, the shape of the human body of the user corresponding to the behavioral data. The shape detection model can be trained based on corresponding pairs of input behavioral data (for example, entire purchase histories or a certain window of purchase histories) and output parametric models of body surface shapes.

The output body shape model can be one or more statistical models trained using, for example, Motion and Shape Capture ("MOSH") technology or SMPL technology. While marker based motion capture uses a skeleton that acts as a proxy for human movement, MOSH replaces the skeleton with a parametric 3D body model. Given a standard marker set, MOSH simultaneously estimates the marker locations on a proxy 3D body model, estimates the body shape, and recovers the articulated body pose. By allowing body shape to vary over time, MOSH is able to capture the non-rigid motion of soft tissue. The SMPL body model is described in more detail with respect to FIG. 4B. Other parametric body models can be used in other embodiments, where a parametric body model represents the contours of body surfaces using a small number of parameters (e.g., 10, 20, or 30).

The particular machine learning model chosen for the shape prediction model may depend, at least in part, on the amount of data available for training the model. For example, initially the machine learning system 224 may have a limited quantity of labeled training data, that is, behavioral histories of particular users where the 3D body shape of such users is known. In such early stages, the known body shapes may be of users who voluntarily submit 3D body scans, or of users who have submitted a sufficient quantity and/or variety of images of their body such that the 3D shape of their body can be automatically extracted from these images. Other early stage training data can come from submitting one or more images of a user to raters to evaluate the body shape using linguistic descriptions and then extracting body shape from the linguistic descriptions, for example, using the Body Talk techniques (Streuber, S., Quiros-Ramirez, M., Hill, M., Hahn, C., Zuffi, S., O'Toole, A., Black, M. J. Body Talk: Crowdshaping Realistic 3D Avatars with Words. ACM Trans. Graph. (Proc. SIGGRAPH), 35(4):54:1-54:14, July 2016, the contents of which are incorporated in their entirety herein by reference). Other metrics such as age, height, weight, gender, and the like can be used to create the training body shapes.

With the training body shapes defined, the machine learning system 224 can define the training behavioral data. While some forms of metadata (e.g., relationship status) may be available for many people, many others will appear only sparsely (e.g., "#plussize"). There are effectively an infinite number of possible hash tags, likes, and/or purchases that could be associated with any individual. Consequently, the disclosed techniques can take a large and/or sparse set of behavioral data and relate it to a compact representation of body shape. The machine learning system 224 can convert all behavioral data into numeric values. For data such as item purchases, this can be done by treating them as a binary value (1 if the item is purchased and 0 otherwise). These may be very sparse so they can be grouped into categories so that purchases from an individual item in a category count as a purchase from the category. Even with such grouping or clustering there may be tens of thousands of categories, each only sparsely represented; that is any one user may only have purchases within a few of the categories. Purchases can either be treated as binary (either the category is purchased from or not) or as integers based on the frequency with which a person has purchased items within the category. The same techniques can be used with "likes" in social media contexts or with other types of behavioral data. The disclosed approach is agnostic to how the low-level behavior is classified and grouped into higher-level categories, and also as to how fine grained such categories are.

Embodiments of the machine learning system 224 can employ several methods, including linear correlation analysis, and clustering, to identify the most relevant behavioral data (words, tags, etc.). The goal is to identify subsets of behavioral data that are either correlated with an individual's body shape, or predictive of an individual's membership in a subpopulation that includes a distribution of body shapes that is statistically different from that of the general population. For example, in the case of athletic individuals, the machine learning system 224 might identify a class of behavioral data (e.g., membership in a college sports team, or "liking" a particular fitness-focused brand/product) that defines a subpopulation whose mean body shape is quantifiably "more fit" than that of the general population. As a result, the behavioral data in question can be used to make a meaningful prediction about an individual's body shape as being "more fit" even in the absence photos or measurements. By placing an individual into multiple such subpopulations, the machine learning system 224 can further refine the shape estimate.

Embodiments of the machine learning system 224 can also go beyond this to mine images that a person likes or has posted to extract behavioral data and relate this to body shape. Using deep neural networks, it is possible, for example, to detect that an image contains a wine bottle, bicycle, mountain, etc. Such categories are equivalent to the categories of things a person "likes" and can be included in a matrix of user likes. Analysis of body shape then can proceed from images that appear to have nothing to do with the person's body.

Also, given body shape information and metadata, the machine learning system 224 can learn what behavioral data is predictive of two users having similar body shapes. Some purchases, activities, likes, etc. are predictive of two users having a similar shape. The machine learning system 224 does not need to reconstruct this shape to correlate the users to each other; it only needs to know what behavioral data predicts that two people are similar. This provides a method to allow the analysis of body shape similarity from behavioral data. The key observation is that not all likes or behavioral data provide the same confidence in this. For example, liking the "weather channel" may not convey information about body shape (but it might) while liking a diet soft drink might. Once the machine learning system 224 has the relationship to body shape, it can bypass body shape and simply correlate people to each other or to shape categories based on the behavioral data alone.

Suitable machine learning models in early stages (as well as later, once further training data is acquired) can include nearest neighbor searching, kernel-based methods, and linear correlation analysis. For example, a nearest neighbor search may involve creating a measure of behavioral history for each of a number of users with known body shape, mapping this measure into a feature space, identifying a certain number or percentage of nearest neighbors, ascertaining the body shapes of these nearest neighbors, and taking a weighted average of these body shapes. Thereafter, other users whose histories map to that location in the feature space may be predicted to have the weighted average body shape. As another example, the machine learning system 224 can use a matrix of users and behavioral history (for example, represented in a low-dimensional/vector form) and compress it using, for example, singular value decomposition. Any individual's activity can then be projected onto a low dimensional linear subspace, giving coefficients that characterize the activity of that user in the low-dimensional space. Matrix factorization can be used to predict the low dimensional activity of other users, which may in turn be used to predict their body shape.

The machine learning system can accumulate more training data by validating these predicted body shapes, for example, by recommending clothing items to users based on the predicted body shape and tracking how the users interact with these recommendations. To illustrate, a user purchasing and keeping a recommended clothing item can be considered as a strong signal that the predicted body shape was correct, and the behavioral data and predicted body shape of that user can be added to the training data 232.

The body shape prediction models described herein can be implemented as artificial neural networks. For example, once the training data set grows, deep learning may be suitable for identifying correlations between user behavioral histories and their corresponding body shapes. Artificial neural networks are artificial in the sense that they are computational entities, inspired by biological neural networks but modified for implementation by computing devices. Artificial neural networks are used to model complex relationships between inputs and outputs or to find patterns in data, where the dependency between the inputs and the outputs cannot be easily ascertained. A neural network typically includes an input layer, one or more intermediate ("hidden") layers, and an output layer, with each layer including a number of nodes. A neural network is considered "deep" when it includes two or more hidden layers. The nodes in each layer connect to some or all nodes in the subsequent layer and the weights of these connections are typically learned from data during the training process, for example, through backpropagation in which the network parameters are tuned to produce expected outputs given corresponding inputs in labeled training data. Thus, an artificial neural network is an adaptive system that is configured to change its structure (e.g., the connection configuration and/or weights) based on information that flows through the network during training, and the weights of the hidden layers can be considered as an encoding of meaningful patterns in the data.

In the neural network example, input behavioral data can be converted into low-dimensional vector form and provided to the input nodes of the neural network. The neural network can include a set of output nodes each mapped to a different body model in a set of body models (for example, the SMPL shape data set described with respect to FIG. 4B, and more specifically to different identity-dependent blend shapes that each transform a template mesh into a mesh corresponding to a different body shape). During inference (e.g., use of a trained model), the neural network can perform a forward pass of the input behavioral vector through its layers to generate a value at each output node representing a probability that the body model (e.g., an identity-dependent blend shape) associated with that particular output node represents the actual body shape of the user. The output node with the highest probability can be used to identify the predicted body model of the user.

In some embodiments, the machine learning system 224 can train models to make predictions in the other direction—starting from body shape and predicting behavior. For example, the known body shape of a user can be provided as input to such a model, with the output being a prediction of items (or item categories) the user would like to purchase, or content categories that are predicted to interest the user.

The recommendation engine 125 can use the determined body shape in a number of ways. As described above, the recommendation engine 125 can use the identified body model and/or body shape features 120 to identify particular items represented in the item data repository 135 that would fit the body shape of the user. The recommendation engine 125 can generate a user interface to recommend these items to the user, for example, displaying clothing items over a visual depiction of the body model to give the user a sense of the fit of the items. The recommendation engine 125 can additionally or alternatively use the body shape for fitness analysis, to predict clothing size, or to predict tailoring measurements.

Referring still to FIG. 2, the processor 242 may include one or more programmed computers, dedicated microprocessors, graphics processors, or other processing devices capable of communicating electronic information. Examples of the processor 242 include one or more application-specific integrated circuits ("ASICs") (e.g., processors designed specifically for machine learning training and/or inference), graphical processing units ("GPUs"), field programmable gate arrays ("FPGAs"), graphics processing units ("GPUs"), digital signal processors ("DSPs") and any other suitable processors. The processor 242 may be implemented as appropriate in hardware, firmware, or combinations thereof with specific, computer-executable instructions and/or software. Such specific computer-executable instructions and software may include computer-executable or machine-executable instructions written in any suitable programming language to perform the various functions described.

In some examples, the shape prediction system 205 may also include additional storage 244, which may include removable storage and/or non-removable storage. The additional storage 244 may include, but is not limited to, magnetic storage, optical disks, and/or solid-state storage. The disk drives and their associated computer-readable media may provide non-volatile storage of computer-readable instructions, data structures, program modules, and other data for the computing devices. The memory 220 and the additional storage 244, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture.

The shape prediction system 205 may also include input/output ("I/O") device(s) and/or ports 246, such as for enabling connection with a keyboard, a mouse, a pen, a voice input device, a touch input device, a display, speakers, a printer, or other I/O device. The shape prediction system 205 may also include a user interface 248. The user interface 248 may be utilized by a user to access portions of the computing environment 200. In some examples, the user interface 248 may include a graphical user interface, web-based applications, programmatic interfaces such as application programming interfaces ("APIs"), or other user interface configurations. The user interface 248 can include displays of the recommendations described herein. In some embodiments, the I/O device(s) and/or ports 246 and user interface 248 can be part of a user computing device accessing the shape prediction system 205 via network 260.

The shape prediction system 205 may also include a data store 230. Due to the potentially sensitive nature of body shape data, the data store 230 can include a security module 250 for implementing protective digital privacy measures to prevent unauthorized access to user body shape data. In some examples, the data store 230 includes one or more data stores, databases, data structures, or the like for storing and/or retaining information associated with the computing system 200. Thus, the data store 230 may include data structures, such as the training data repository 232, model parameters data repository 234, user behavioral data repository 236, body shape features 120, and item data 135. Data repositories can include a single database or multiple distinct databases, and may be stored using a single electronic storage device or multiple distinct electronic storage devices.

As described above, the machine learning system 224 may include a number of machine learning models that perform different tasks for recognizing human body shape in input behavioral data. The machine learning system 224 can also include instructions for training these models in order to learn the parameters that enable the models to identify the desired features represented by input data. The training data repository 232 stores training data that can be used to learn these parameters, for example, labeled pairs of input data and the corresponding or expected output. The model parameters data repository 234 stores the parameters of machine learning models, including neural networks, trained as described herein. For example, the model parameters data repository 234 can store the finalized parameters of the trained body shape prediction model 110.

The user behavioral data repository 236 comprises one or more physical data storage devices that stores logged user behaviors with respect to representations of items within a network environment ("item interactions") and/or on social networking sites, optionally together with time data for the events. Each of the interactions and associated time data may be stored in, and maintained by, the user behavioral data repository 236 with respect to a timeline for a particular user or aggregate group of users. This can, for example, in the ecommerce context, include item purchase histories, item viewing histories, item add histories (for example, adding an item to a cart without subsequently purchasing the item or adding the item to a wish list or registry), item sharing, item ratings, item reviews, and the like. Outside of the ecommerce context an item can be a network page or network site visited by a user, a digital advertisement selected by a user, a link or content "liked" or otherwise characterized by the user (e.g., the user selected an option to indicate/display their liking/disliking of, agreement/disagreement with, etc., the link or content), or other types of interactive digital content. In some embodiments, an item interaction event may include an identifier for the item (for example, an item number, stock keeping unit (SKU), etc.), an indication of the type of interaction, or any other suitable information.

The item data repository 135 comprises one or more physical data storage devices that stores data representing the items of the catalog service 226, including the items being considered for recommendation. In the context of the electronic catalog, item data can include names, images, prices, descriptions, user reviews (textual or numerical ratings), category/subcategory within a hierarchy of browsable categories of the electronic catalog, and sizing information (for items such as clothing). The body shape features data repository 120 comprises one or more physical data storage devices that stores information relating to features of body shape. This information may be stored as a mapping between particular ones of the body models and corresponding body features, for example measurements (e.g., one-dimensional ("1D") tailoring measurements, sizes), body shape categories, and/or facets of body shape.

The shape prediction system 205 can communicate over network 260 with the image capture device 204 and user devices 202. In some embodiments, the shape prediction system 205 can be included in the image capture device 204 and/or user devices 202. The network 260 can include any appropriate network, including an intranet, an internet, a cellular network, a local area network, a wide area network or any other such network or combination thereof. For example, network 260 may be a publicly accessible network of linked networks, possibly operated by various distinct parties, such as the Internet. In other embodiments, the network 260 may include a private network, personal area network, local area network, wide area network, cable network, satellite network, cellular telephone network, etc., or a combination thereof, some or all of which may or may not have access to and/or from the Internet.

Data from the image capture device 204 can be used for generating labeled training data in some embodiments. Image capture device 204 includes optical components (e.g., one or more lenses, color filters) and an image sensor configured to capture image data. Some embodiments may also include a light source (e.g., a laser of a laser scanning system). The image sensor can be a charge-coupled device ("CCD"), complementary metal oxide semiconductor sensor ("CMOS"), or any other image sensing device that receives light and generates image data in response to the received image. A sensor can have an array of photosensitive elements that produce raw values for image pixels. The image capture device 204 can also include an image signal processor configured to perform various processing operations on received raw image data to output a processed image. Examples of image processing operations include cropping, scaling (e.g., to a different resolution), image format conversion, image filtering (e.g., spatial image filtering), lens artifact or defect correction, demosaicing, etc. The image capture device 204 can also include a memory storing instructions for capturing and processing images and for storing any generated image data.

User devices 202 can include any network-equipped computing device, for example, desktop computers, laptops, smartphones, tablets, e-readers, gaming consoles, wearable devices, and the like. Users can access the shape prediction system 205 to interact with, for example, electronic catalog 226, and receive recommendations from the shape prediction system 205 via the network 260. In some embodiments, the components of the shape prediction system 205 may be incorporated into the user devices 202. In some embodiments, the components of the image capture device 204 and the shape prediction system 205 may be incorporated into the user devices 202.

Overview of Machine Learning Training and Inference Processes

Figure 3A:
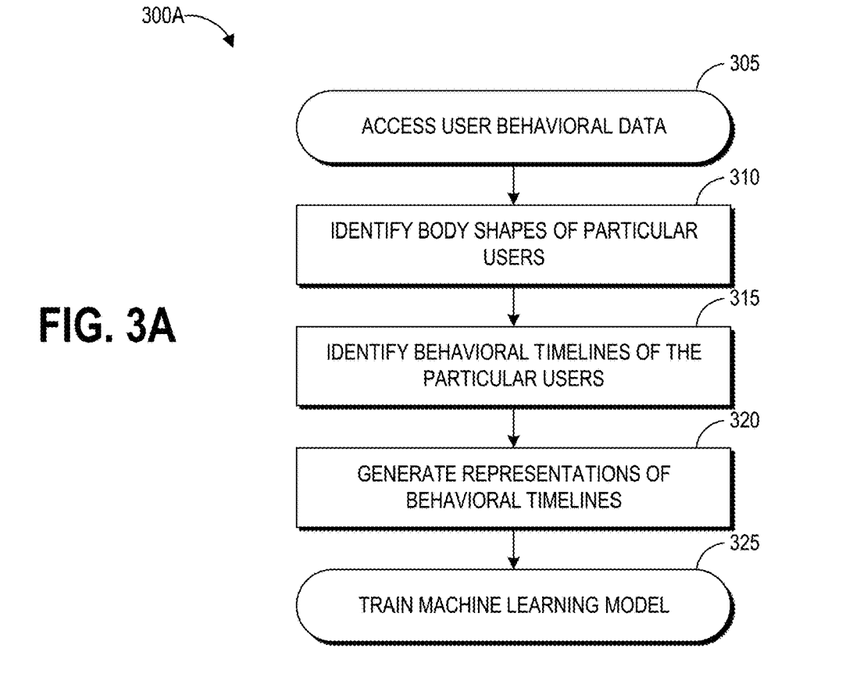
FIG. 3A is a flow diagram of an illustrative process for training a machine learning model to predict body shape from behavioral data using the system of FIG. 2.

FIG. 3A is a flow diagram of an illustrative process 300A for training a machine learning model to predict body shape from behavioral data. The process 300A can be implemented by components of the shape prediction system 205, or another suitable computing system. As described further below, the process 300A may be executed periodically (e.g., once per day) or intermittently (e.g., upon collection of a certain quantity of new search training data) in an offline mode.

The process 300A may begin in response to an event, such as on a predetermined or dynamically determined schedule, on demand when initiated by a user, or in response to some other event. For example, the process 300A may be executed in an offline mode periodically, for example, once per day, month, or in response to some other timing specification. When the process 300A is initiated, a set of executable program instructions stored on one or more non-transitory computer-readable media (e.g., hard drive, flash memory, removable media, etc.) may be loaded into memory (e.g., random access memory or "RAM") of a server or other computing device of the computing environment 200. The executable instructions may then be executed by a hardware-based computer processor (e.g., a central processing unit or "CPU") of the computing device. In some embodiments, the process 300A or portions thereof may be implemented on multiple computing devices and/or multiple processors, serially or in parallel.

At block 305, the shape prediction system 205 accesses user behavioral data in the user behavioral data repository 236. As described herein, this can include shopping history, a "like" history, and other behavioral data including one or more actions performed by each of a number of users.

At block 310, the shape prediction system 205 identifies known body shapes of particular users. As described herein, during initial training these may be shapes estimated from body scans of particular users, or shapes estimated from image data of particular users. As the system is used and tested, these may be shapes predicted for particular users that have been confirmed by the users, either explicitly or implicitly through their interactions with recommendations based on the predicted shapes.

At block 315, the shape prediction system 205 identifies specific behavioral timelines within the behavioral data that correspond to the particular users. During training, the pairing of the behavioral data of a particular user with the known shape of that user enables the model to tune its parameters to make shape predictions of other users based on their behavioral data.

At block 320, the shape prediction system 205 generates representations of the behavioral timelines of individual users that are suitable for input into the machine learning model. Suitable formats include, for example, vector, tensor, matrix, and set representations of the behavioral data. This can involve determining that particular actions fall into particular categories and setting a value of that category accordingly.

At block 325, the shape prediction system 205 trains the machine learning model to predict the expected output (e.g., the known body shape) from the provided input (e.g., the corresponding behavioral timeline). As described above, this model can be a neural network, k-nearest neighbor model, or linear correlation model. Once training is complete, the model parameters are stored in the model parameters data repository 234 for later use in predicting the body shapes of other users based on their behavioral data.

The process 300A can be performed in an offline mode. As used herein, "offline" or "offline mode" refers to processing operations relating to data and/or calculations that are pre-computed, that is, performed in advance of an event that may trigger output of a recommendation as described herein. The trained model can then later be used to generate recommendations for users as they interact with the electronic catalog.

Figure 3B:
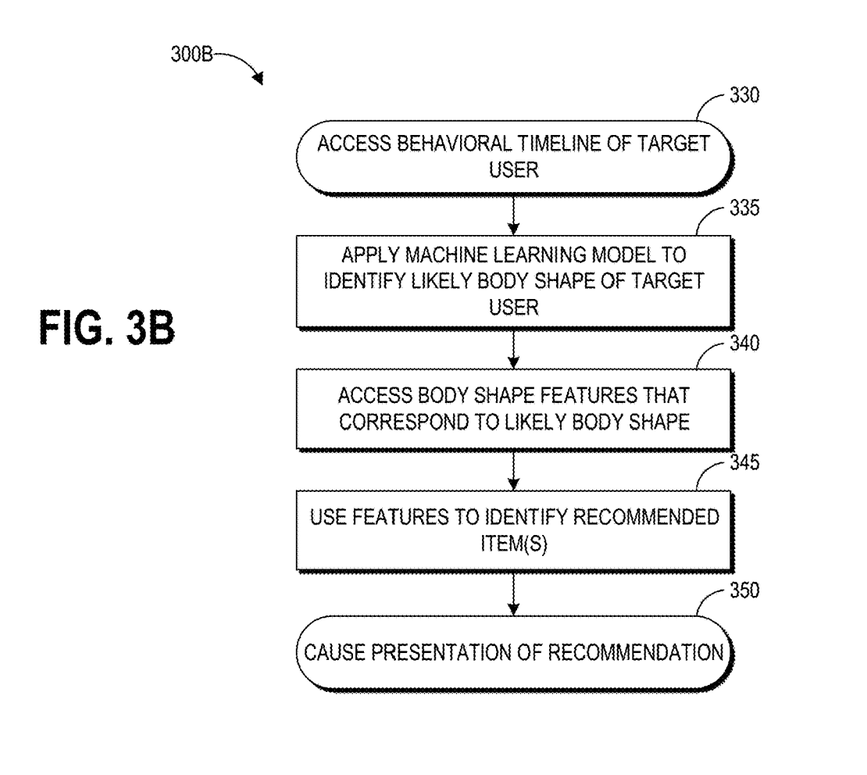
FIG. 3B is a flow diagram of an illustrative process for using a trained machine learning model, for example, a model trained according to the process of FIG. 3A, to predict body shape from behavioral data and present recommendations accordingly.

FIG. 3B is a flow diagram of an illustrative process 300B for using a trained machine learning model, for example, a model trained according to the process 300 of FIG. 3A, to predict body shape from behavioral data and present recommendations accordingly. The process 300B can be implemented by components of the system 200 or another suitable system. When the process 300B is initiated, a set of executable program instructions stored on one or more non-transitory computer-readable media may be loaded into memory of a server or other computing device. The executable instructions may then be executed by a hardware-based computer processor of the computing device. In some embodiments, the process 300B or portions thereof may be implemented on multiple computing devices and/or multiple processors, serially or in parallel.

At block 330, the shape prediction system 205 accesses the behavioral timeline of the target user (e.g., the user to whom a recommendation will be presented) from the behavioral data repository 236. As described herein, this can include shopping history, a "like" history, and other behavioral data for a number of users; however it should include a similar set of behaviors as were used to train the model in the process 300A.

At block 335, the shape prediction system 205 applies the trained machine learning model to identify the likely body shape of the target user. In the embodiment of a trained neural network, this can involve generating a representation of the behavioral timeline in a format that corresponds to that used during training, and computing a forward pass of this representation through the layers of the neural network. The predicted shape of the user can be identified based on the body model or other body shape representation that is associated with the output node having the highest score, in some implementations.

At block 340, the shape prediction system 205 can access body shape features that correspond to the predicted body model. As described above, this can be a measurement mapping 120 to determine tailoring measurements (e.g., waistband, inseam, or other 1D measurements), clothing sizes, body metrics, body shape category, or other desired sizing metrics that correspond to the predicted body model.

At block 345, the shape prediction system 205 can use the body shape features to identify recommended items that would fit the user. Other criteria can be used to select subsets of such size-appropriate items, for example, brand, style, and color preferences of the user.

At block 350, the shape prediction system 205 can cause presentation of the recommendation to the user. In some examples, the recommendation can include a visual depiction of the body model dressed in a computer simulation of the clothing item. In other examples, the recommendation can include an indication of how the item will fit the user without necessarily displaying the body model itself. For example, the clothing item can be depicted as it would if it were deformed by the contours of the body model. As another example, the user interface can display a textual representation of the fit, for example "Based on your predicted shape, this shirt will fit tightly around the shoulders." Some examples may only display a portion of a body model, for example a head wearing a hat item, or a foot wearing a shoe item. Beneficially, these types of information can enable a user to more easily ascertain the fit of the item, which may otherwise be a challenge in online shopping. The interface can include user-selectable features to acquire the item.

The process 300B is performed in an online mode. As used herein, "online" or "online mode" refers to processing operations performed as a user is currently interacting with a networked system such as an electronic catalog. The generated recommendations can be provided to users in "real time." For example, a recommendation user interface provided in real time can be generated and then displayed to a user as the user is interacting with the electronic catalog.

Body Model Examples

Figure 4A:
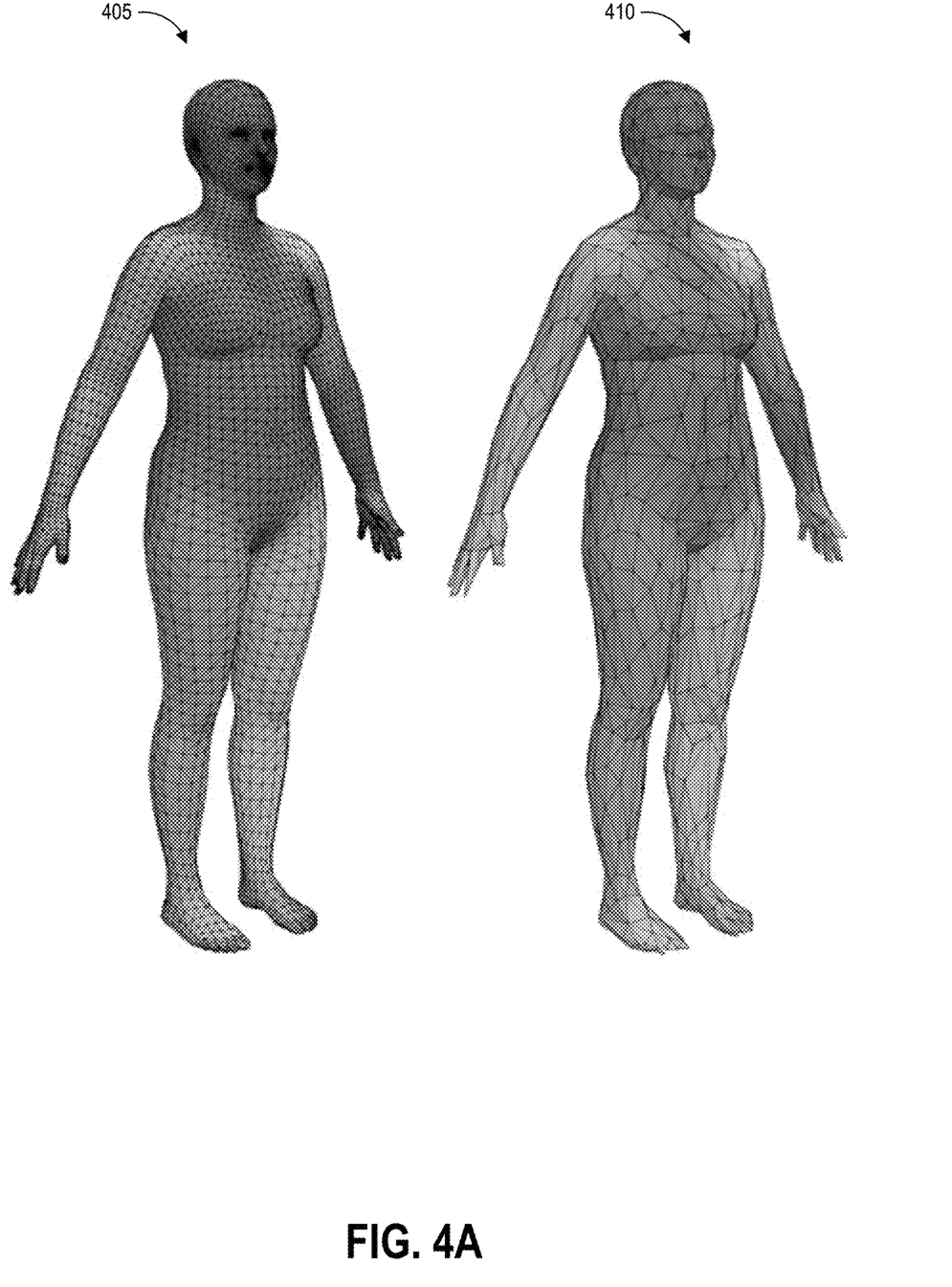
FIGS. 4A-4B depict examples of body shape related data that can be output by a machine learning model as described herein.
Figure 4B:
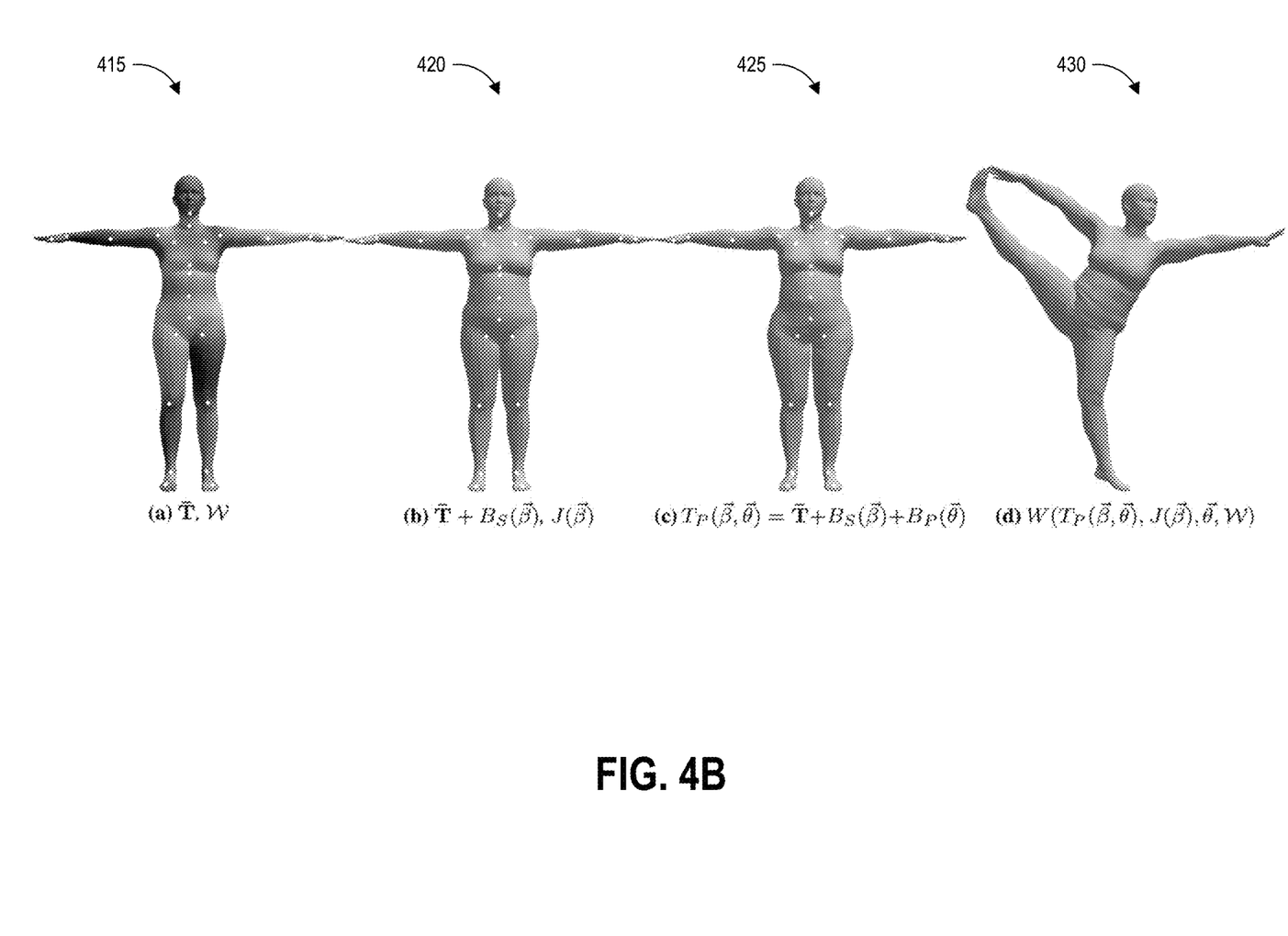

FIGS. 4A-4B depict examples of body shape related data that can be output by a shape detection model as described herein. These represent some examples of suitable models that can be used by the machine learning systems and recommendations user interfaces described herein. Other examples include the SCAPE model (Shape Completion and Animation for PEople), blendSCAPE model, or other suitable models for representing a variety of body shapes.

FIG. 4A depicts two examples of three-dimensional representations of a typical female shape. The first representation 405 is at a resolution of 6890 vertices and the second representation 410 is at a resolution of 863 vertices. These examples are provided to illustrate and not intended to limit the disclosed three-dimensional body representation to a particular number of vertices.

FIG. 4B depicts an example of the SMPL model that can be used to generate the set of potential body models considered by the machine learning system 224, and also to generate poses for the recommendation engine 125 to use while displaying recommended clothing items "worn" by a particular body model. The SMPL model decomposes body shape into identity-dependent shapes and non-rigid pose-dependent shapes, and takes a vertex-based skinning approach that uses corrective blend shapes applied to a template body model. Thus, the SMPL model is a skinned vertex-based model that represents a variety of body shapes, as well as represents these body shapes in a variety of poses. The parameters of the model include a rest pose template mesh, initial blend weights, pose-dependent blend shapes, identity-dependent blend shapes, and a regressor from vertices to joint locations. The shape and pose parameters that deform the template body model into shape and pose specific body models, respectively, are learned from a corpus of training data scans. Thus, the SMPL model is able to realistically model both a variety of body shapes as well as soft tissue deformation of those body shapes during motion.

Reference number 415 illustrates a body model template mesh, T. The SMPL model begins with an artist-created mesh with N=6890 vertices and K=23 joints (though these particular numbers may vary in different implementations of the SMPL model). The mesh has the same topology for men and women, spatially varying resolution, a clean quad structure, a segmentation into parts, initial blend weights W, and a skeletal rig. The template mesh 415 is depicted with joints shown in white. The blend weights W indicate how many and/or which joint locations affect a given vertex of the mesh. The template mesh 415 can be represented by a vector of N concatenated vertices $T \in \Re^{3N}$ in the illustrated rest pose, $\vec{\theta}^*$; a set of blend weights $W \in \Re^{N \times K}$.

Reference number 420 illustrates the template mesh 415 with identity-driven blendshape contributions (e.g., the blendshapes that transform the template mesh into a mesh representing a particular body shape). A blend shape function $B_s(\vec{\beta}): \Re^{|\vec{\beta}|} \to \Re^{3N}$ can take as input a vector of shape parameters, $\vec{\beta}$, and output a blend shape sculpting the template mesh 415 into the subject identity (e.g., a body-shape-specific mesh). Additionally, a joint location function predicts K joint locations (shown as the white dots in FIG. 4B), $J(\vec{\beta}): \Re^{|\vec{\beta}|} \to \Re^{3K}$ as a function of the shape parameters, $\vec{\beta}$. The body model can be represented by the template mesh, the blend shape function, and the joint location function.

Reference number 425 illustrates the shape-specific mesh 420 with the addition of pose blend shapes in preparation for the split pose shown in reference number 430. This body model 425 represents the shape of the soft tissue deformation of the shape-specific mesh 420 in the particular pose of the posed body model 430, but without repositioning the joints according to the pose. A pose-dependent blend shape function, $B_P(\vec{\theta}): \Re^{|\vec{\theta}|} \mapsto \Re^{3N}$, takes as input a vector of pose parameters, $\vec{\theta}$, and accounts for the effects of pose-dependent soft tissue deformations. The corrective blend shapes of the blend shape function, the joint location function, and the pose-dependent blend shape function are added together in the rest pose as illustrated by the body model 425.

Reference number 430 illustrates the pose-deformed, shape specific body model repositioned into the depicted splits pose, with deformed vertices reposed by dual quaternion skinning for the splits pose. A blend skinning function $W(\cdot)$ is applied to rotate the vertices of the mesh around the estimated joint centers with smoothing defined by the blend weights. The result is a model, $M(\vec{\beta}, \vec{\theta}; \phi): \Re^{51} \vec{\theta}^{|\vec{\theta}|} \vec{\beta}^{|\vec{\beta}|} \to \Re^{3N}$, that maps shape and pose parameters to vertices as shown by the body model 430. Here, $\phi$ represents the SMPL model parameters that are learned from training data.

Further details of the SMPL model are described in Loper, M., Mahmood, N., Romero, J., Pons-Moll, G., Black, M. J. SMPL: A Skinned Multi-Person Linear Model. ACM Trans. Graphics (Proc. SIGGRAPH Asia), 34(6):248:1-248:16, ACM, New York, Ny, October 2015, the contents of which are hereby incorporated in their entirety by reference.

Additional Example Body Shape Prediction Examples

People also post, label, and comment on vast amounts of image and video data on the Internet. Images of a user contain shape information that can be extracted using computer vision algorithms. Many websites enable people to comment on images or describe them via the means of various tags (e.g., hash tags). These tags often contain descriptive information about what is in the image; e.g., "#plussize" may indicate that the person in the image is of larger than a particular size. Textual comments may also contain words and semantic information related to the body shape in the image; e.g., "looking fit!". Using face recognition it is possible to identify the individual in the image data; such tags are often available. This makes it possible to associate the comments or tags with the individual.

Beyond images of themselves, however, people post all sorts of other images using social media websites and mobile applications. For example, they may take pictures of particular foods, water skiing, mountain biking, etc. Analysis of the content of these other images can provide weak cues about the individual. Current computer vision methods are getting sufficiently accurate that such automatic image content analysis is possible using, for example, deep neural networks.

Non-limiting types of information about users that can be included in their behavioral data includes: (i) their "friends"; (ii) sites, posts, groups etc. that they "like" or "follow"; (iii) demographics; (iv) things they take pictures of (and the extracted contents therein) (v) shopping behavior; (vi) foods they like and activities they do; (vii) jobs they have held; (viii) education; (ix) activity of family members or friends (secondary behavioral data); (x) health records; (xi) comments and hashtags on images, events, other comments; (xii) things they have written (reviews, prose, blogs . . . ); (xiii) which websites they visit; (xiv) how much time they spend on different websites; (xv) purchasing habits; and (xvi) scheduling habits.

Terminology

Implementations disclosed herein provide systems, methods and apparatus for training and using machine learning models. The disclosed training and prediction models can be implemented in machine learning systems. As used herein, such systems include electronic memory storing computer-executable instructions for performing the described training and/or prediction operations and hardware processors that execute the instructions.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a graphics processing unit ("GPU"), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, in some embodiments, as the context may dictate, the terms "approximately," "about," and "substantially" may refer to an amount that is within less than or equal to 10% of a pre-defined threshold or amount. The term "generally" as used herein represents a value, amount, or characteristic that predominantly includes or tends toward a particular value, amount, or characteristic.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a memory in which data is collected, the data comprising:
(i) for each user of a plurality of users of an electronic catalog, behavioral data of the user, wherein the behavioral data comprises a plurality of metadata obtained from a social networking site that does not pertain to a body shape of the user; and
(ii) for each user of the plurality of users, body model data representing the body shape of the user, wherein the body model data comprises a parametric three-dimensional ("3D") body model, wherein the parametric 3D body model is associated with the body shape of the user, and wherein the parametric 3D body model is estimated from image data of the user; and
a processor in communication with the memory, the processor programmed by specific computer-executable instructions to at least:
generate a vector representation of the behavioral data for each user of the plurality of users;
generate a plurality of training data pairs, wherein each training data pair includes, for a different one of the plurality of users, (i) the vector representation of the behavioral data of the user, and (ii) the parametric 3D body model associated with the body shape of the user;
train, with the plurality of training data pairs, a machine learning model that determines which behavioral data of the training data pairs provide predictive signals with respect to body shape, wherein training generates at least one weight within the machine learning model that represents at least one correlation between the behavioral data represented within the training data pairs and the parametric 3D body models included in the training data pairs;
access behavioral data of a target user of the electronic catalog;
apply the machine learning model, trained with the plurality of training data pairs, to the behavioral data of the target user to generate a predicted parametric 3D body model corresponding to a body shape of the target user;
identify, from the electronic catalog, a selected item for the target user;
determine a predicted fit between the target user and the selected item based at least partly on the predicted parametric 3D body model corresponding to the body shape of the target user; and
initiate display of a user interface depicting the selected item and an indication of the predicted fit.

2. The system of claim 1, wherein the processor is further programmed by specific computer-executable instructions to at least identify the selected item based at least partly on the predicted parametric 3D body model.

3. The system of claim 1, wherein the machine learning model comprises a deep neural network.

4. The system of claim 1, wherein the processor is further programmed by specific computer-executable instructions to at least:
determine a number of the plurality of training data pairs; and
based at least partly on the number of the plurality of training data pairs, select at least one of a k nearest neighbor analysis or a deep neural network as the machine learning model.

5. The system of claim 1, wherein the behavioral data of the target user are different from the behavioral data of the plurality of training data pairs.

6. The system of claim 1, wherein the predicted parametric 3D body model comprises a skinned vertex-based model that transforms a template body mesh into a body mesh that corresponds to the body shape of the target user, and wherein the indication of the predicted fit comprises a visual representation of the skinned vertex-based model wearing the selected item.

7. A computer implemented method comprising:
for each user of a plurality of users:
generating a vector representation of behavioral data of the user, wherein the behavioral data comprises a plurality of metadata obtained from a social networking site that does not pertain to a body shape of the user, and
generating a parametric three-dimensional ("3D") body model associated with the body shape of the user, wherein the parametric 3D body model is estimated from one of a body scan or image data of the user;
generating a plurality of training data pairs, wherein each training data pair includes: (i) the vector representation of the behavioral data of a user of the plurality of users, and (ii) the parametric 3D body model associated with the body shape of a user of the plurality of users;
training, with the plurality of training data pairs, a machine learning model to determine which behavioral data of the training data pairs provide predictive signals with respect to body shape, wherein training generates at least one weight within the machine learning model that represents at least one correlation between the behavioral data represented within the training data pairs and the parametric 3D body models included in the training data pairs;
identifying, from an electronic catalog of items, a selected item to display to a target user;
accessing behavioral data of the target user;
applying the machine learning model to the behavioral of the target user to generate a predicted parametric 3D body model associated with a body shape of the target user;
determining a predicted fit between the target user and the selected item based at least partly on the predicted parametric 3D body model; and
initiating display of a user interface depicting the selected item and an indication of the predicted fit.

8. The computer implemented method of claim 7, further comprising:
determining a number of the plurality of training data pairs; and
based at least partly on the number of the plurality of training data pairs, selecting at least one of a k nearest neighbor analysis or a deep neural network as the machine learning model.

9. The computer implemented method of claim 7, wherein the machine learning model comprises a deep neural network, and wherein the computer implemented method further comprises:
providing the vector representation of the behavioral data included in a training pair of the plurality of training pairs to an input layer of the deep neural network; and
modifying parameters of the deep neural network based at least partly on a comparison of an output of the deep neural network and the parametric 3D body model included in the training pair of the plurality of training pairs.

10. The computer implemented method of claim 7, wherein the predicted parametric 3D body model comprises a skinned vertex-based model with identity-dependent blend shape, wherein the identity-dependent blend shape transforms a template body mesh of the skinned vertex-based model into a body mesh of the body shape of the target user, and wherein applying the machine learning model to the behavioral data of the target user identifies the identity dependent blend shape.

11. The computer implemented method of claim 10, wherein the indication of the predicted fit comprises a visual representation of the predicted parametric 3D body model wearing the selected item, the method further comprising applying the identity-dependent blend shape to the template body mesh of the body model to generate the visual representation of the predicted parametric 3D body model.

12. The computer implemented method of claim 11, wherein the user interface depicts the visual representation of the predicted parametric 3D body model overlaid with a representation of the selected item.

13. A non-transitory computer-readable medium storing instructions that, when executed by a processor, cause the processors to perform operations comprising:

for each user of a plurality of users,
  generating a vector representation of behavioral data of the user wherein the behavioral data comprises a plurality of metadata obtained from a social networking site that does not pertain to a body shape of the user, and
  generating a parametric three-dimensional ("3D") body model associated with the body shape of the user;
generating a plurality of training data pairs, wherein each training data pair includes: (i) the vector representation of the behavioral data of a user of the plurality of users, and (ii) the parametric 3D body model associated with the body shape of a user of the plurality of users;
training, with the plurality of training data pairs, a machine learning model to learn which behavioral data of the training data pairs provide predictive signals with respect to body shape, wherein training generates at least one weight within the machine learning model that represents at least one correlation between the behavioral data represented within the training data pairs and the parametric 3D body models included in the training data pairs;
accessing behavioral data of a target user;
providing the behavioral data of the target user as input into the machine learning model;
determining, based at least partly on an output of the machine learning model, a predicted parametric 3D body model associated with a body shape of the target user;
determining a predicted fit between the target user and an item of an electronic catalog based at least partly on the predicted parametric 3D body model; and
initiating display of a user interface depicting the item and an indication of the predicted fit.

14. The non-transitory computer-readable medium of claim 13, wherein the parametric 3D body model associated with a body shape of each user is generated based at least partly on a 3D scan of the target user.

15. The non-transitory computer-readable medium of claim 13, wherein the parametric 3D body model associated with a body shape of each user is generated based at least partly on one or more images depicting the target user.

16. The non-transitory computer-readable medium of claim 13, wherein the parametric 3D body model comprises a skinned vertex-based model with an identity-dependent blend shape, wherein the identity-dependent blend shape transforms a template body mesh of the skinned vertex-based model into a body mesh of the body shape of the target user, the operations further comprising identifying the identity-dependent blend shape using the machine learning model.

17. The non-transitory computer-readable medium of claim 16, wherein the indication of the predicted fit comprises a visual representation of the predicted parametric 3D body model wearing the item, the operations further comprising generating the visual representation of the predicted parametric 3D body model by applying the identity-dependent blend shape to the template body mesh.

18. The non-transitory computer-readable medium of claim 17, wherein the indication of the predicted fit comprises a visual representation of the item deformed by exterior contours of the template body mesh with the identity-dependent blend shape applied.

* * * * *

UNITED STATES PATENT AND TRADEMARK OFFICE
CERTIFICATE OF CORRECTION

PATENT NO. : 11,461,630 B1
APPLICATION NO. : 15/913589
DATED : October 4, 2022
INVENTOR(S) : Michael Julian Black It is certified that error appears in the above-identified patent and that said Letters Patent is hereby corrected as shown below:

On the Title Page

Column 1, (Assignee) Line 2, delete "Wisenschaften" and insert -- Wissenschaften --.

In the Specification

Column 5, Line 48, delete "of" and insert -- of the --.

In the Claims

Column 21, Line 26, Claim 13, delete "user" and insert -- user, --.

Signed and Sealed this
Tenth Day of January, 2023

Katherine Kelly Vidal
*Director of the United States Patent and Trademark Office*